(12) United States Patent
Seibold

(10) Patent No.: US 10,899,253 B2
(45) Date of Patent: Jan. 26, 2021

(54) LATCHING DEVICE AND A SLOUCH SEAT INCLUDING THE LATCHING DEVICE

(71) Applicant: Adient Luxembourg Holding S.à r.l., Luxembourg (LU)

(72) Inventor: Kurt Seibold, Farmington Hills, MI (US)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 68 days.

(21) Appl. No.: 16/064,185

(22) PCT Filed: Dec. 23, 2015

(86) PCT No.: PCT/IB2015/059954
§ 371 (c)(1),
(2) Date: Jun. 20, 2018

(87) PCT Pub. No.: WO2017/109554
PCT Pub. Date: Jun. 29, 2017

(65) Prior Publication Data
US 2019/0001845 A1    Jan. 3, 2019

(51) Int. Cl.
*B60N 2/30* (2006.01)
*B60N 2/22* (2006.01)

(52) U.S. Cl.
CPC ........... *B60N 2/309* (2013.01); *B60N 2/2209* (2013.01); *B60N 2/3031* (2013.01); *B60N 2/3047* (2013.01); *B60N 2/3065* (2013.01); *B60N 2/3093* (2013.01)

(58) Field of Classification Search
CPC .. B60N 2/2209; B60N 2/3031; B60N 2/3065; B60N 2/309; B60N 2/3047; B60N 2/3093
USPC ............................................. 297/342, 331, 334
See application file for complete search history.

(56) References Cited

U.S. PATENT DOCUMENTS

| | | | | |
|---|---|---|---|---|
| 2,270,172 A | * | 1/1942 | Ruegger | B60N 2/10 297/329 |
| 5,785,384 A | * | 7/1998 | Sagstuen | A47C 1/032 297/317 |
| 7,090,240 B2 | * | 8/2006 | Papac | A61G 5/12 280/250.1 |
| 9,102,250 B2 | * | 8/2015 | Seibold | B60N 2/24 |

(Continued)

FOREIGN PATENT DOCUMENTS

| | | |
|---|---|---|
| CN | 104972933 A | 10/2015 |
| CN | 204870636 U | 12/2015 |

(Continued)

OTHER PUBLICATIONS

Chinese Patent Office, Chinese Office Action in application 201580085538.X, dated Mar. 16, 2020, 7 pages.

*Primary Examiner* — Milton Nelson, Jr.
(74) *Attorney, Agent, or Firm* — Marshall & Melhorn, LLC

(57) ABSTRACT

A vehicle slouch seat having a carriage that includes a front side and a rear side. A link element is located on a rear side of the carriage and a slideable element is located on the front side of the carriage. A cushion is movable in an upward direction with the carriage connected to a base structure at one of a plurality of latch points. The cushion is prevented being rotated in the upward direction via a cushion rotational prevention structure with the carriage connected to the base structure at another one of the plurality of latch points.

19 Claims, 19 Drawing Sheets

(56) References Cited

U.S. PATENT DOCUMENTS

| | | | |
|---|---|---|---|
| 9,987,955 B2* | 6/2018 | Ecker | B60N 2/0232 |
| 2007/0096497 A1 | 5/2007 | Adragna et al. | |
| 2007/0132266 A1* | 6/2007 | Ghergheli | B60N 2/206 |
| | | | 296/65.09 |
| 2013/0049425 A1 | 2/2013 | Runde et al. | |
| 2014/0167466 A1 | 6/2014 | Line et al. | |
| 2015/0021958 A1 | 1/2015 | Fukutani et al. | |
| 2015/0165935 A1* | 6/2015 | Sachs | B60N 2/2222 |
| | | | 297/342 |
| 2015/0298582 A1 | 10/2015 | Elton | |
| 2016/0339813 A1* | 11/2016 | Dubois | B60N 2/0232 |

FOREIGN PATENT DOCUMENTS

| | | | | |
|---|---|---|---|---|
| DE | 10 2004 047250 A1 | 6/2005 | | |
| WO | WO-2006061507 A1 * | 6/2006 | | B60N 2/22 |
| WO | 2010/062684 A1 | 6/2010 | | |
| WO | 2012/162123 A1 | 11/2012 | | |
| WO | 2015/107212 A1 | 7/2015 | | |
| WO | 2015107212 A1 | 7/2015 | | |
| WO | 2015/173108 A1 | 11/2015 | | |

* cited by examiner

LATCHING DEVICE AND A SLOUCH SEAT INCLUDING THE LATCHING DEVICE

CROSS REFERENCE TO RELATED APPLICATIONS

This application is a United States National Phase Application of International Application PCT/IB2015/059954 filed Dec. 23, 2015, the entire contents of which are incorporated herein by reference.

FIELD OF THE INVENTION

The present invention relates to a latch device and a slouch seat that comprises the latching device, particularly a slouch seat for a motor vehicle.

BACKGROUND OF THE INVENTION

A slouch seat is normally provided in motor vehicles, particularly in a rear cab of a truck. Conventional slouch seats involve various tracks and interlocking elements. The various components of conventional slouch seats provide for a complicated design, which significantly increases manufacturing costs due to the amount of time it takes to assemble the numerous components.

SUMMARY OF THE INVENTION

An object of the invention is to provide a latching device that does not include the interlocking elements of conventional designs and a slouch seat that comprises the latching device so that a simpler and less complicated latching device and slouch seat are provided.

According to the present invention, a vehicle slouch seat comprises a carriage, a link element and a slideable element. The carriage comprises a front side and a rear side. The link element is located on the rear side of the carriage. The slideable element is located on the front side of the carriage.

The vehicle slouch seat may further comprise a cushion, a base structure and a latching element. The carriage and the cushion may be locked to the base structure via the latching element.

The cushion may be in a substantially upright position with the carriage in a predetermined position.

The vehicle slouch seat may further comprise a rotational lockout means for preventing the cushion from being moved in an upward direction unless the cushion is in a predetermined position.

According to the present invention, a latching device for a slouch seat comprises a latching element for locking a carriage and a cushion to a base structure.

The latching device may further comprise a rotational lockout means for preventing the cushion from moving in an upward direction unless the cushion is in a predetermined position.

According to the present invention, a vehicle slouch seat comprises a carriage, a link element and a slideable element. The link element is connected to the carriage. The slidable element is connected to the carriage.

The vehicle slouch seat may further comprise a base structure and a latching element. At least the carriage may be connected to the base structure at one of a plurality of latching points via the latching element.

The vehicle slouch seat may further comprise a cushion connected to the carriage. The cushion may be movable from one position to another position with the carriage connected to the base structure in one of the latching points. The cushion may be movable relative to the carriage with the carriage connected to the base structure in the one of the latching points.

The cushion may be in a substantially horizontal position in the one position. The cushion may be in a substantially vertical position in the another position.

The cushion may be fixed to the carriage and the base structure via the latching element.

The cushion may be fixed dynamically to the carriage via an inertia latch.

The vehicle slouch seat may further comprise a cushion rotational prevention means for restricting movement of the cushion in an upward direction with the carriage connected to the base structure at another one of the plurality of latching points.

The base structure may comprise a cushion stop portion. The cushion rotational prevention means may comprise the cushion stop portion.

The cushion may be fixed relative to the carriage with the carriage connected to the base structure at another one of the latching points.

The link element may be pivotably connected to the base structure.

The slidable element may move relative to the base structure when the carriage moves from the one of the plurality of latching points to another one of the plurality of latching points.

The plurality of latching points may comprise yet another latching point. Movement of the cushion may be restricted in the upward direction via the cushion rotational prevention means with the carriage connected to the base structure at the yet another latching position.

The cushion may comprise a first cushion end portion and a second cushion end portion. The first cushion end portion may be located adjacent to at least a portion of the carriage. The second end portion may be located at a first distance from the base structure with the carriage connected at the another one of the plurality of latching points. The second cushion end portion may be located at a second distance from the base structure with the carriage connected at the yet another one of the latching positions. The second distance may be greater than the first distance.

The link element may be in a first position with the carriage connected to the base structure at the one of the latching points. The link element may be at a first angle relative to the carriage with the carriage in the one of the plurality of latching points. The link element may be located at a second angle relative to the carriage with the carriage connected to the base structure at the another one of the plurality of latching points. The link element may be located at a third angle relative to the carriage with the carriage connected to the base structure at the yet another one of the plurality of latching points. The first angle may be less than the second angle and the third angle.

The cushion may comprise an end portion. The end portion may extend to a position beyond the cushion stop portion of the base structure with the carriage connected to the base structure at the one of the latching positions. The end portion may be located at a position above the cushion stop portion of the base structure with the carriage connected to the base structure at the another one of the latching points. The end portion may be located at another position above the cushion stop portion of the base structure with the carriage connected to the base structure at the yet another one of the latching points.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
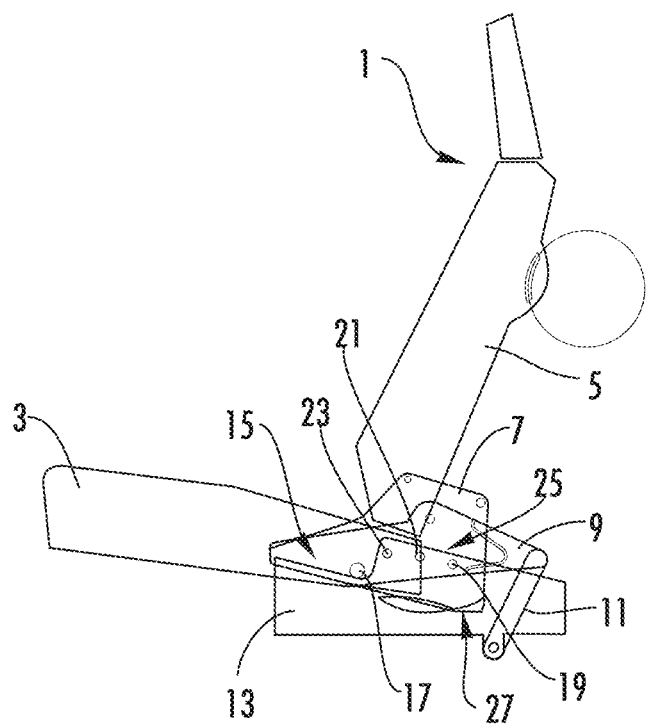
FIG. 1 is a side view of a slouch seat of the invention in a first seat configuration.

Referring to the drawings in particular, FIG. 1 is a side view of a vehicle slouch seat 1 in a first seat configuration. The vehicle slouch seat 1 is in a first position in FIG. 1. The vehicle slouch seat 1 includes a cushion 3 and a seat back structure 5. The cushion 3 engages at least a leg portion of a user. The seat back structure 5 supports at least a lumbar portion and a shoulder portion of the user. A seat connecting structure 7 is connected to the seat back structure 5 and the cushion 3. The seat connecting structure 7 is connected to a carriage 9. A link element 11 connects the carriage 9 to a base structure 13. The link element 11 may be a tensile element. A compression member 15 is connected to the cushion 3 and the carriage 9. The compression member 15 includes a slidable element 17, which may slide along a track connected to the carriage 9 and/or the base structure 13. In another embodiment, it is possible that the slidable element 17 moves along a surface of the base structure 13. FIG. 1 shows the slouch seat 1 with the carriage 9 connected to the base structure 13 at a first latch point 19 of a plurality of latch points 19, 21, 23. The first latch point 19 of the plurality of latch points 19, 21, 23 is the rearmost latch point with respect to a longitudinal axis of the base structure 13. A latch mechanism 25 locks the cushion 3 to the carriage 9 and the base structure 13 with the carriage 13 at the first latch point 19. The latch mechanism 25 may interact with a portion of the carriage 9 and/or a portion of the base structure 13 to fix the cushion 3 to the carriage 9 and the base structure 13 with the carriage 9 at the first latch point 19. A cushion rotation prevention structure 27 is connected to the base structure 13. The cushion rotation prevention structure 27 includes a portion of the base structure 13 that interacts with a portion of the seat connecting structure 7 to prevent the cushion 3 from moving in an upward direction when the cushion 3 and/or the carriage 9 is not in a rearmost position. With the cushion 3 locked to the carriage 9 and the base structure 13 via the latching mechanism 25 with the carriage 9 at the first latch point 19, the cushion 19 is able to move in an upward direction with respect to the carriage 9 and the base structure 13 if a portion of the latching mechanism 25 is released, such as by moving a handle to release a portion of the latching mechanism 25, so that a user is able to push the cushion 3 in the upward direction. In another embodiment, an actuator and/or motor may be used to move the cushion 3 in the upward direction when the carriage 9 is connected to the base structure 13 at the first latch point 19.

Figure 2:
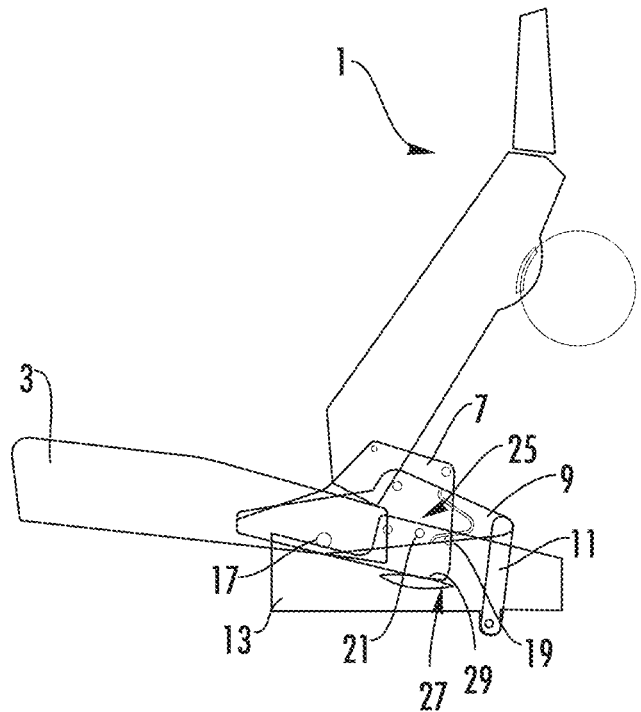
FIG. 2 is a side view of the slouch seat of FIG. 1 in a second seat configuration.

FIG. 2 is a side view of the slouch seat 1 of FIG. 1 in a second seat configuration. The vehicle slouch seat 1 is in a configuration that is different from the configuration of the slouch seat 1 shown in FIG. 1 and the cushion 3 is in a second position that is different from the first position of the cushion 3 in FIG. 1. In FIG. 2, the carriage 9 has been moved from the first latch point 19 to a second latch point 21. The cushion 3 is fixed to the carriage 9 and the seat connecting structure 7 via the latching mechanism 25 with the carriage 9 connected to the base structure 13 at the second latch point 21 so that the cushion 3 is fixed relative to the base structure 13. During movement of the carriage 9 from the first latch point 19 to the second latch point 21, the slideable element 17, the cushion 3, the seat connecting structure 7 and the link element 11 move relative to the base structure 13 based on movement of the carriage 9. A portion 29 of the seat connecting structure 7 is located at a position above the cushion rotation prevention structure 27 with the carriage 9 connected to the base structure 13 at the second latch point 21. With the cushion 3 locked to the carriage 9 and the base structure 13 via the latching mechanism 25 with the carriage 9 connected to the base structure 13 at the second latch point 21, the cushion 3 is prevented from moving in the upward direction by at least the latching mechanism 25. If a portion of the latching mechanism 25 is released with the carriage 9 connected to the base structure 13 at the second latch point 21, the portion 29 of the seat connecting structure 7 engages the cushion rotation prevention structure 27 such that the cushion 3 cannot move in the upward direction.

Figure 3:
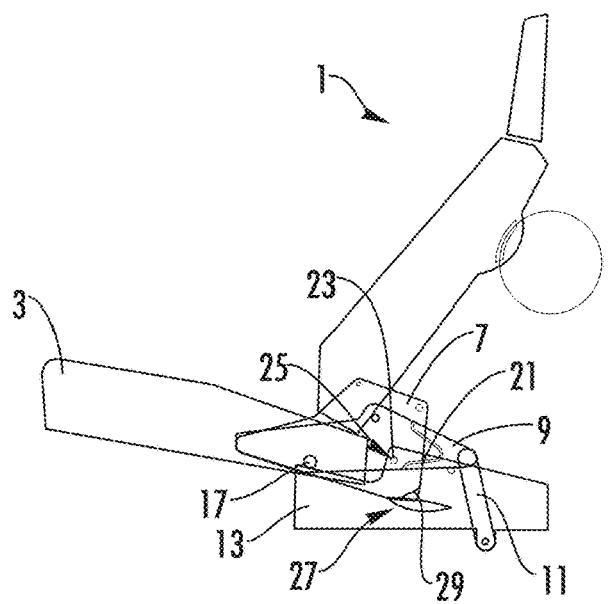
FIG. 3 is a side view of the slouch seat of FIGS. 1 and 2 in a third seat configuration.

FIG. 3 is a side view of the slouch seat 1 of FIG. 2 in a third seat configuration, which defines a maximum reclined position of the slouch seat 1. FIG. 3 shows the slouch seat 1 in a forwardmost position and the cushion 3 in a third position that is different from the first position and the second position of the cushion 3 in FIGS. 1 and 2. In FIG. 3, the carriage 9 has been moved from the second latch point 21 to a third latch point 23. The cushion 3 is fixed to the carriage 9 and the base structure 13 via the latching mechanism 25 with the carriage 9 connected to the base structure 13 at the third latch point 23 such that the cushion 3 is fixed relative to the base structure 13. During movement of the carriage 9 from the second latch point 21 to the third latch point 23, the slideable element 17, the cushion 3, the seat connecting structure 7 and the link element 11 move relative to the base structure 13 based on movement of the carriage 9. A portion of the seat connecting structure 7 is located at a position above a portion of the cushion rotation prevention structure 27. With the carriage 9 connected to the base structure 13 at the third latch point 23, the cushion 3 is prevented from moving in the upward direction by the cushion rotation prevention structure 27 if a portion of the latch mechanism 25 is released. If a portion of the latch mechanism 25 is released with the carriage 9 connected to the base structure 13 at the third latch point 23, the portion 29 of the seat connecting structure 7 engages the cushion rotation prevention structure 27 such that the cushion 3 cannot move in an upward direction.

Figure 4:
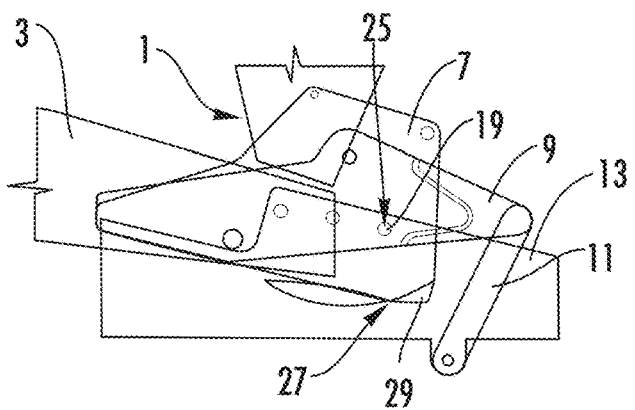
FIG. 4 is an enlarged side view of the slouch seat of FIG. 1.

FIG. 4 is an enlarged side view of the slouch seat 1 with the slouch seat 1 having the first seat configuration shown in FIG. 1. The latch mechanism 25 locks the cushion 3 to the carriage 9 and the base structure 13 with the carriage 9 connected to the base structure 13 at the first latch point 19. The portion 29 of the seat connecting structure 7 is located at a spaced location from the cushion rotation prevention structure 27 such that the portion 29 of the seat connecting structure 7 is located beyond the cushion rotation prevention structure 27. This allows the cushion 3 and the seat connecting structure 7 to rotate relative to the base structure 13 and the carriage 9 and the link element 11 once at least a portion of the latching mechanism 25 is released so that the cushion 3 is movable in the upward direction from one position to another position.

Figure 5:
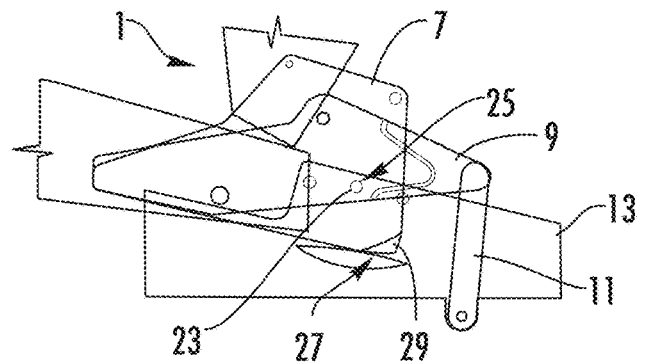
FIG. 5 is an enlarged side view of the slouch seat of FIG. 2.

FIG. 5 is an enlarged side view of the slouch seat 1 with the slouch seat 1 having the second seat configuration shown in FIG. 2. The latch mechanism 25 locks the cushion 3 to the carriage 9 and the base structure 13 with the carriage 9 connected to the base structure 13 at the second latch point 21. The portion 29 of the seat connecting structure 7 is located at a position above the cushion rotation prevention structure 27. If the cushion 3 and/or the seat connecting structure 7 is moved in an upward direction, the portion 29 of the seat connecting structure 7 engages the cushion rotation prevention structure 27 so that the cushion 3 and/or the seat connecting structure 7 cannot be substantially moved in the upward direction. This prevents rotation of the cushion 3 relative to the carriage 9 and the base structure 13 with the carriage 9 connected to the base structure 13 at the second latch point 21.

Figure 6:
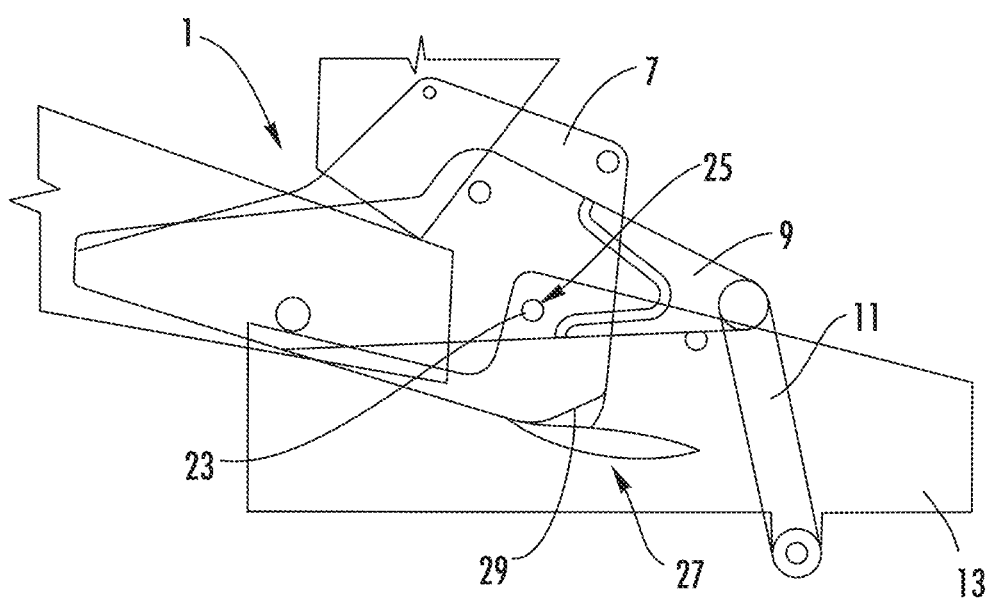
FIG. 6 is an enlarged side view of the slouch seat of FIG. 3.

FIG. 6 is an enlarged side view of the slouch seat 1 with the slouch seat having the third seat configuration shown in FIG. 3. The latch mechanism 25 locks the cushion 3 to the carriage 9 and the base structure 13 with the carriage 9 connected to the base structure 13 at the third latch point 23. The portion 29 of the seat connecting structure 7 is located at a position above the cushion rotation prevention structure 27. The position of the portion 29 is different from the position of the portion 29 shown in FIGS. 4 and 5. If the cushion 3 and/or the seat connecting structure 7 are moved in an upward direction, the portion 29 of the seat connecting structure 7 engages the cushion rotation prevention structure 27 so that the cushion 3 and/or the seat connecting structure 7 cannot be substantially moved in the upward direction. This prevents rotation of the cushion 3 relative to the carriage 9 and the base structure 13 with the carriage 9 connected to the base structure 13 at the third latch point 23.

Figure 7:
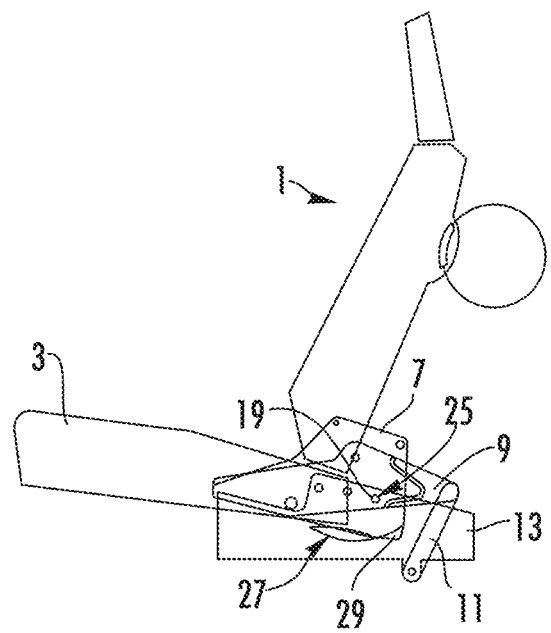
FIG. 7 is another side view of the slouch seat in the first seat configuration.

FIG. 7 is a side view of the slouch seat 1 in the first seat configuration shown in FIG. 1. As previously discussed above, a portion of the seat connecting structure 7 is located at a position beyond the cushion rotation prevention structure 27 with the carriage 9 connected to the base structure 13 at the first latching point 19 so that the cushion 3 is movable in the upward direction relative to the carriage 9, the base structure 13 and the link element 11 after at least a portion of the latching mechanism 25 is released.

Figure 8:
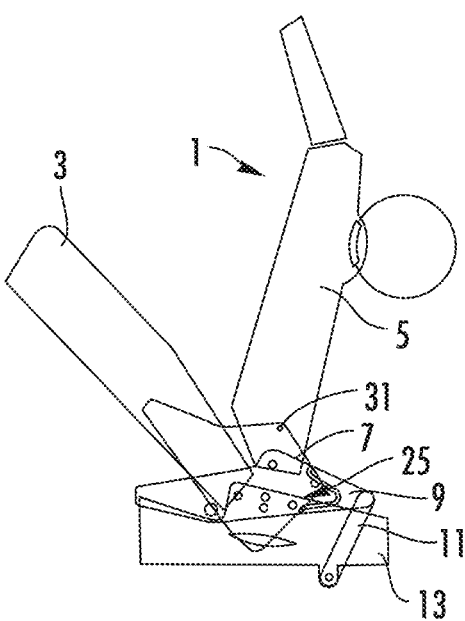
FIG. 8 is a side view of the slouch seat with the cushion moving in an upward direction.

FIG. 8 is a side view of the slouch seat 1 with the cushion 3 moving in the upward direction with the carriage 9 connected to the base structure 13 at the first latching point 19. The cushion 3 and the seat connecting structure 7 are pivotably connected to the seat back structure 5 via a pivotable connection 31. The cushion 3 pivots via the pivotable connection 31 after a portion of the latching mechanism 25 is released, and the carriage 9 fixed to the base structure 13 at the first latching point 19, so that the cushion 3 moves past the cushion rotation prevention structure 27, relative to the seat back structure 5, the base structure 13, the carriage 9 and the link element 11.

Figure 9:
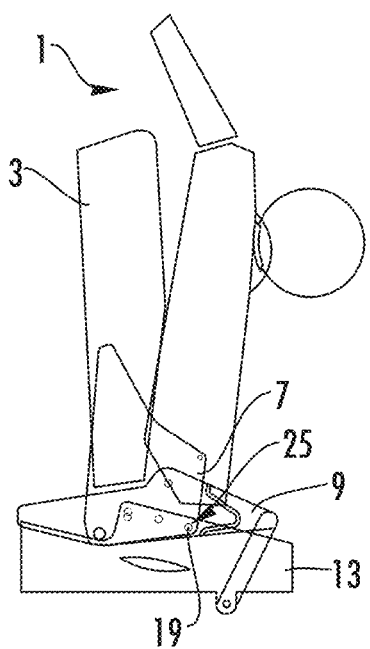
FIG. 9 is a side view of the slouch seat with at least the cushion in a substantially upright (stadium) position.

FIG. 9 is a side view of the slouch seat 1 with the cushion 3 and the seat connecting structure 7 in a substantially upright (stadium) position with the carriage 9 fixed to the base structure 13 at the first latching point 19 and with the cushion 3 locked to the carriage 9 and the base structure 13 via the latching mechanism 25.

Figure 10:
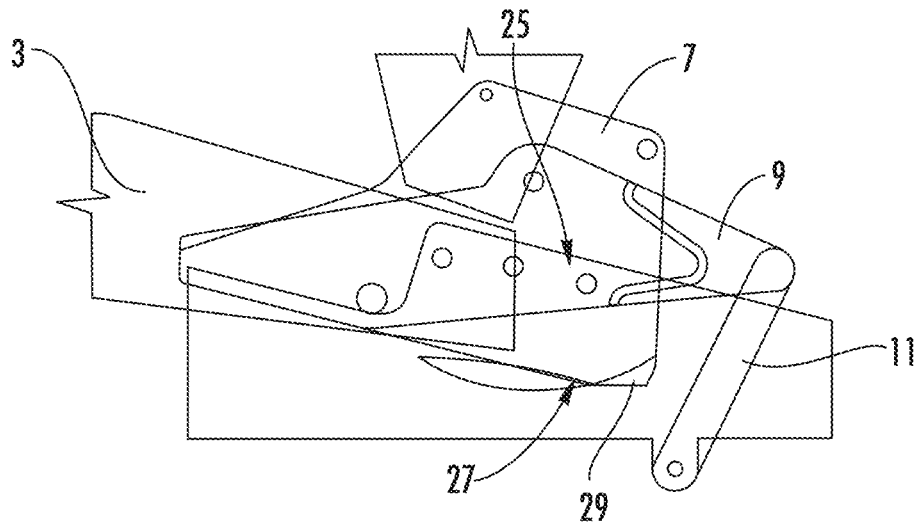
FIG. 10 is an enlarged view of the slouch seat of FIG. 1.

FIG. 10 is an enlarged view of the slouch seat 1 with the slouch seat 1 being in the first seat configuration shown in FIG. 1. The latch mechanism 25 locks the cushion 3 to the carriage 9 and the base structure 13 with the carriage 9 connected to the base structure 13 at the first latch point 19. The portion 29 of the seat connecting structure 7 is located at a spaced location from the cushion rotation prevention structure 27 such that the portion 29 of the seat connecting structure 7 is located beyond the cushion rotation prevention structure 27. This allows the cushion 3 and the seat connecting structure 7 to rotate relative to the base structure 13 and the carriage 9 and the link 11 once a portion of the latching mechanism 25 is released so that the cushion 3 is movable in the upward direction from a substantially horizontal position to the substantially upright (stadium) position.

Figure 11:
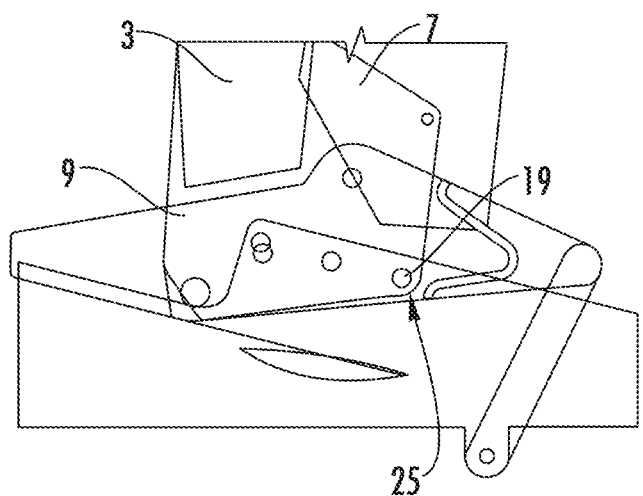
FIG. 11 is an enlarged view of the slouch seat of FIG. 9.

FIG. 11 is an enlarged view of the slouch seat 1 with the slouch seat 1 in the configuration shown in FIG. 9. According to FIG. 11, the cushion 3 and the seat connecting structure 7 are in the substantially upright (stadium) position with the carriage 9 fixed to the base structure 13 at the first latching point 19 and the cushion 3 is locked to the carriage 9 and the base structure 13 via the latching mechanism 25.

Figure 12:
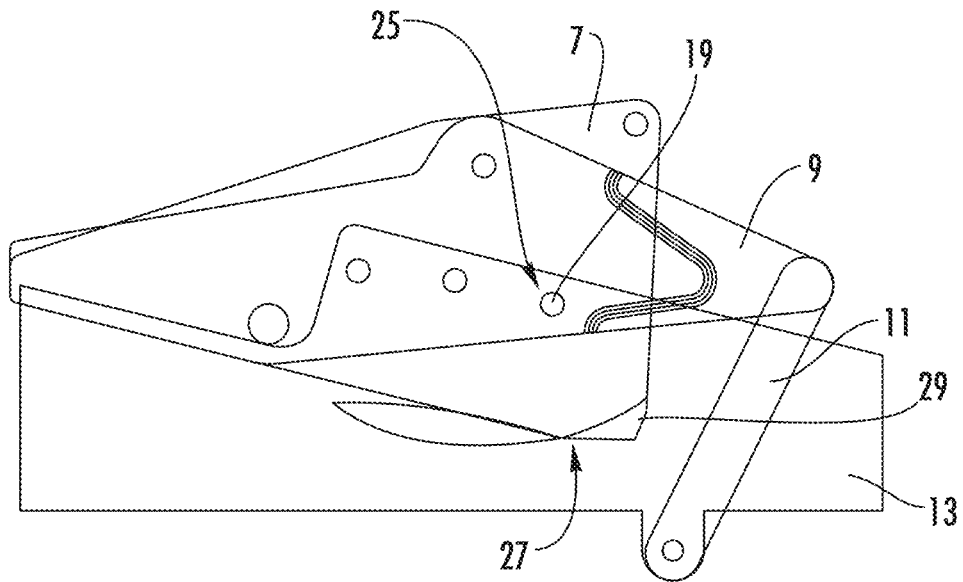
FIG. 12 is an enlarged view of the slouch seat with the slouch seat being in the first seat configuration.
Figure 13:
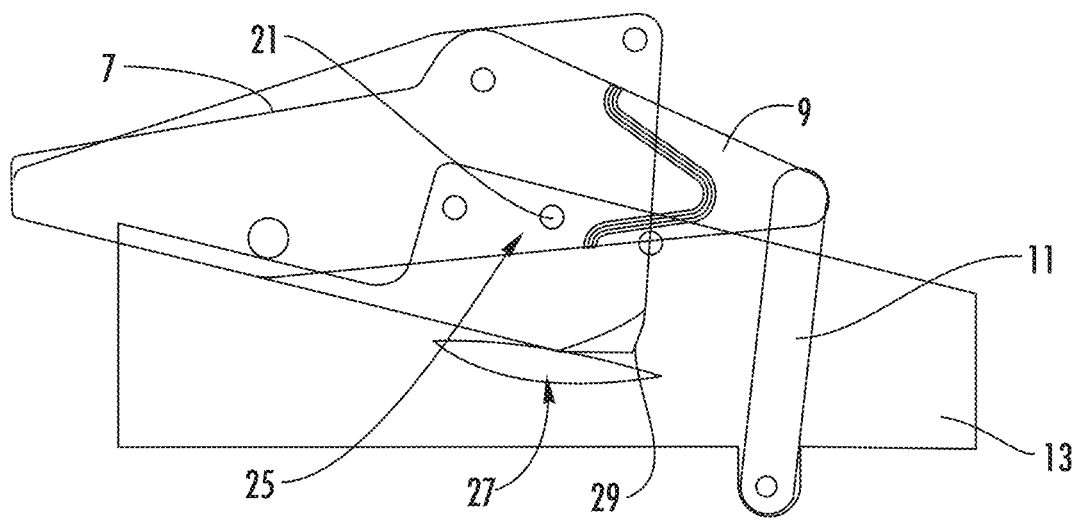
FIG. 13 is an enlarged view of the slouch seat with the slouch seat being in the second seat configuration.
Figure 14:
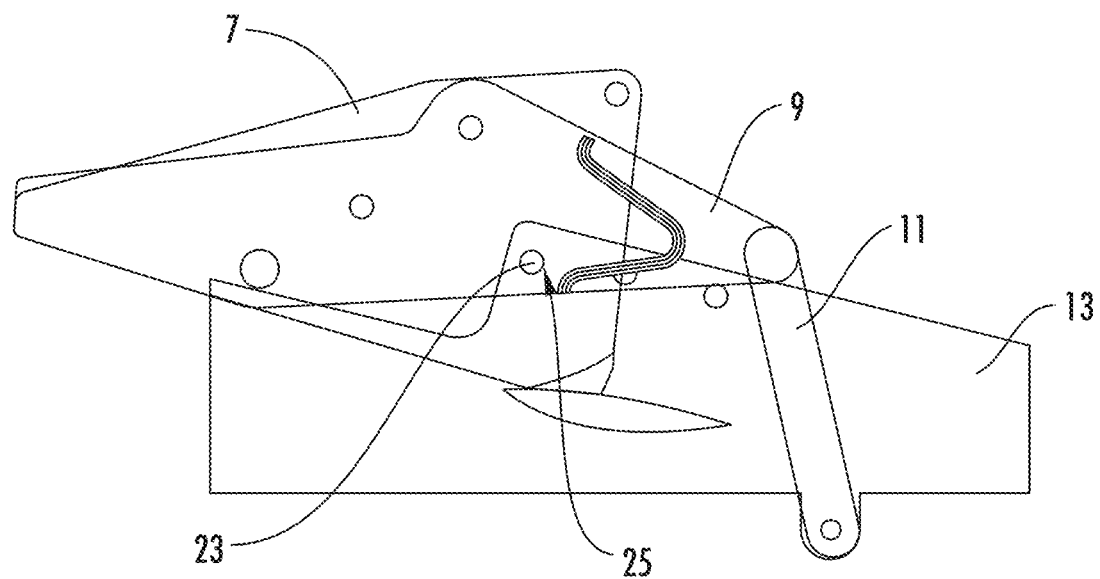
FIG. 14 is an enlarged view of the slouch seat with the slouch seat being in the third seat configuration.

FIGS. 12, 13 and 14 show the progression of the carriage 9 moving from the first latch point 19 to the second latch point 21 and from the second latch point 21 to the third latch point 23. In order to avoid repetition, the features of FIGS. 12, 13 and 14 are not described as FIG. 12 shows the same features as shown in FIG. 4, FIG. 13 shows the same features as shown in FIG. 5 and FIG. 14 shows the same features as shown in FIG. 6.

Figure 15:
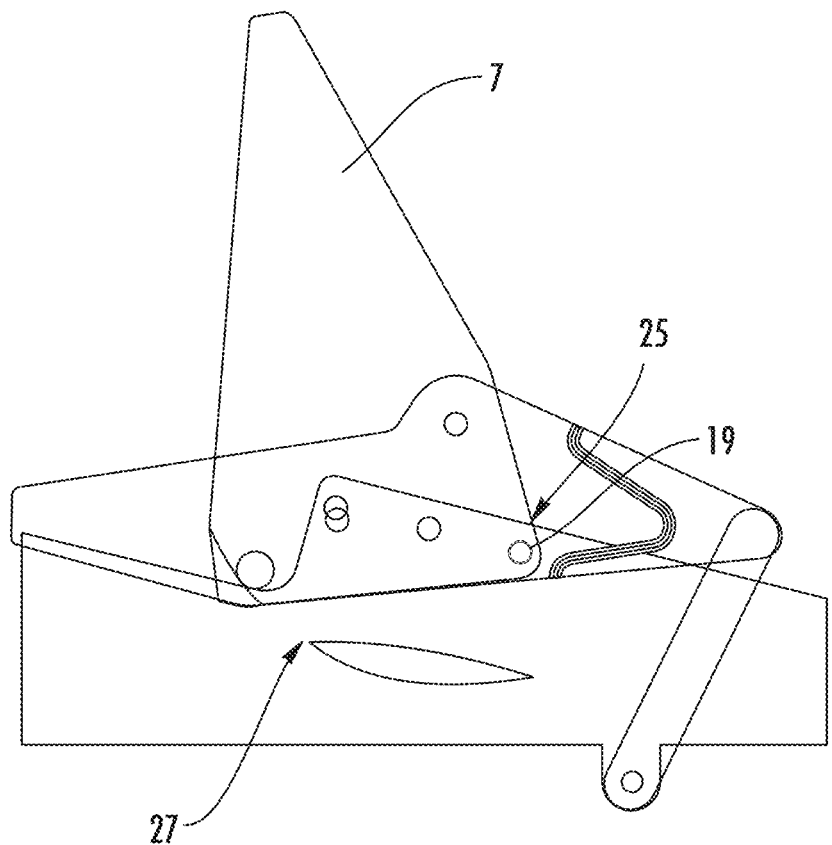
FIG. 15 is an enlarged view of the slouch seat of FIG. 9.

FIG. 15 is an enlarged view of the slouch seat 1 with the slouch seat having the configuration shown in FIG. 9. According to FIG. 15, the cushion 3 and the seat connecting structure 7 are in the substantially upright (stadium) position with the carriage 9 fixed to the base structure 13 at the first latching point 19 and the cushion 3 is fixed to the carriage 9 and the base structure 13 via the latching mechanism 25.

Figure 16:
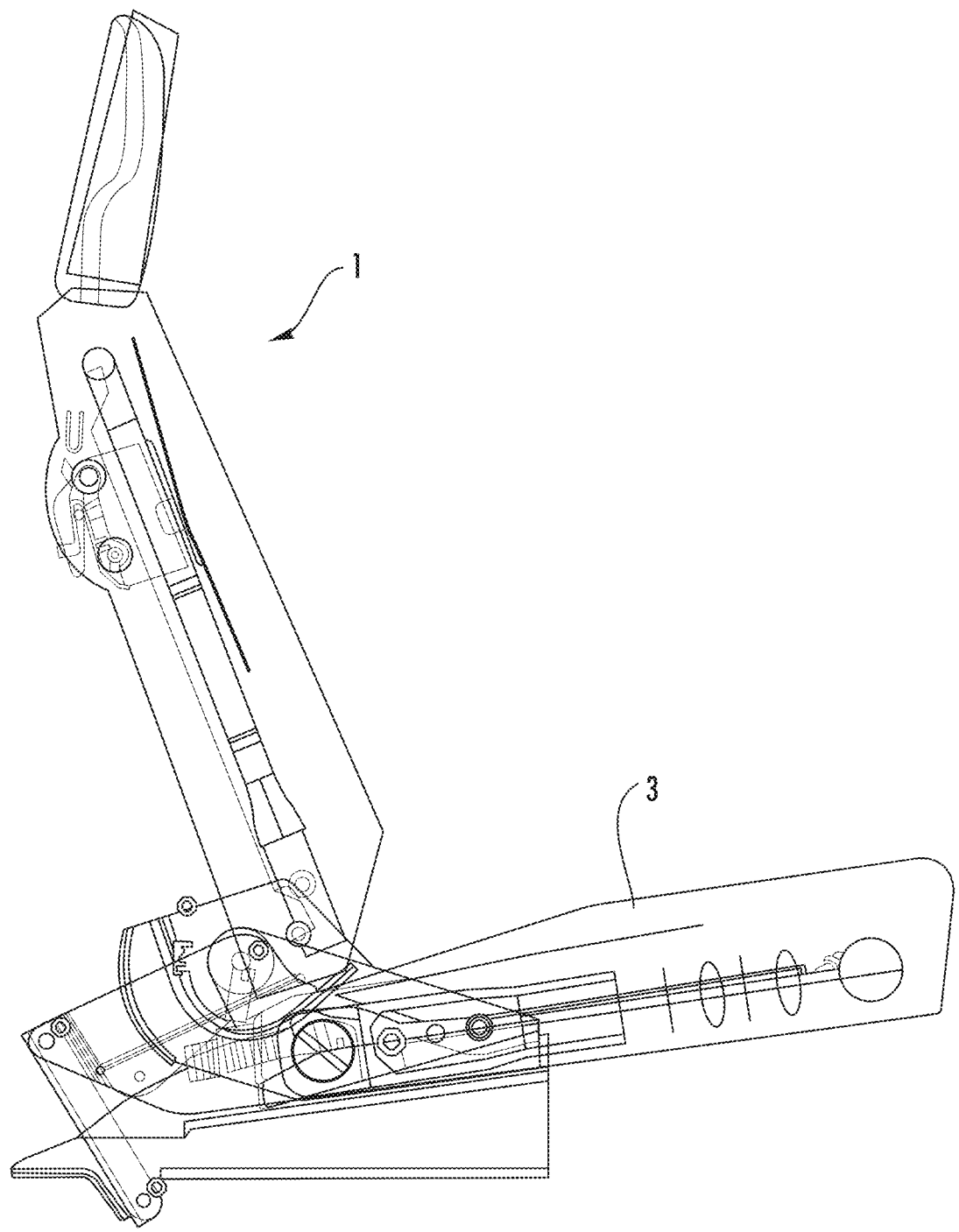
FIG. 16 is a side view of the slouch seat with the cushion in a substantially horizontal position.
Figures 17, 18:
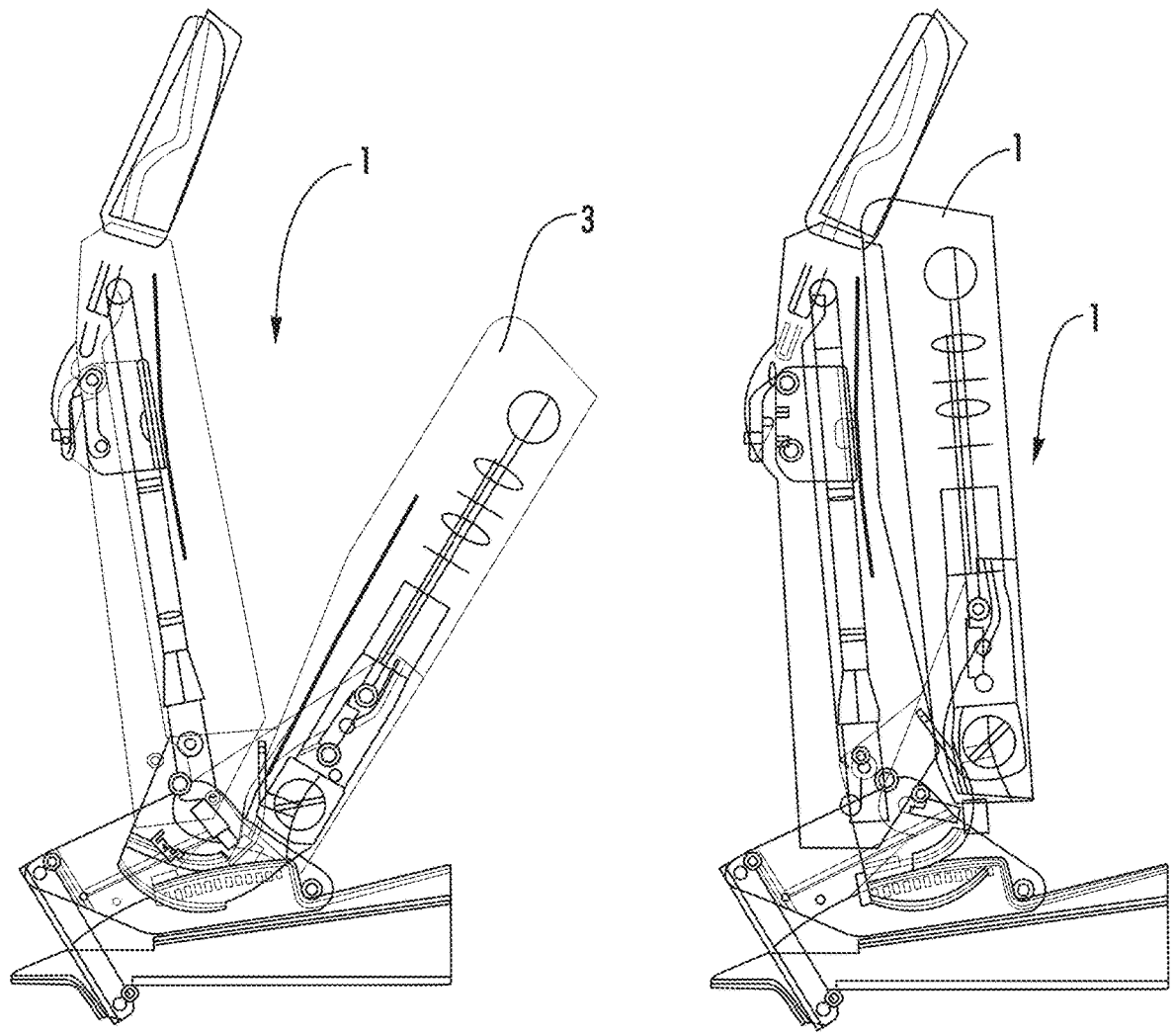
FIG. 17 is another side view of the slouch seat with the cushion in a moving position.
FIG. 18 is yet another side view of the slouch seat with the cushion in a substantially upright (stadium) position.

FIGS. 16, 17 and 18 are side views of the slouch seat 1 and show a progression of movement of the cushion 3 from a substantially horizontal position (FIG. 16) to a moving position (FIG. 17) to a substantially vertical (stadium) position. In order to avoid repetition, the features of FIGS. 16, 17 and 18 are not described as FIG. 16 shows the same features as shown in FIG. 7, FIG. 17 shows the same features as shown in FIG. 8 and FIG. 18 shows the same features as shown in FIG. 9.

Figure 19:
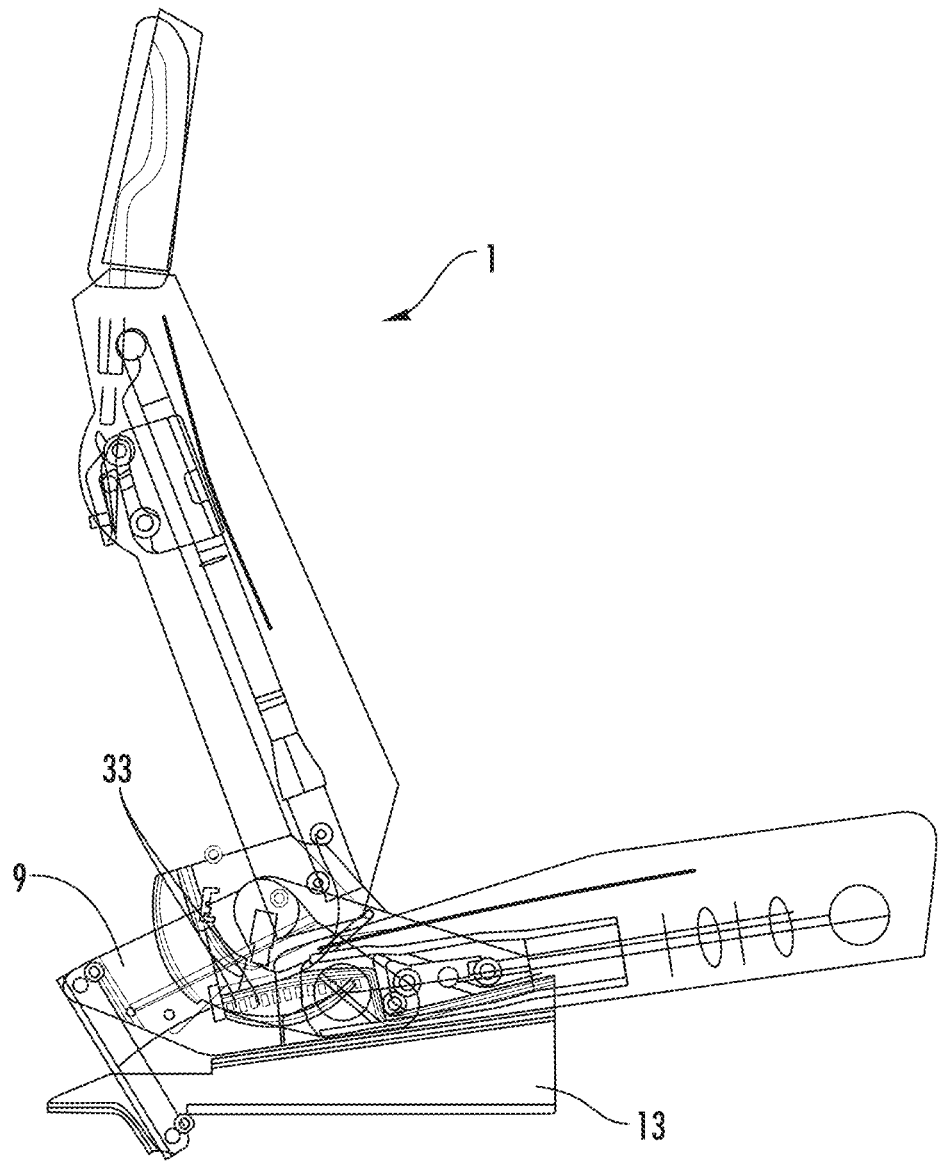
FIG. 19 is a side view of the slouch seat with the carriage in one position.
Figure 20:
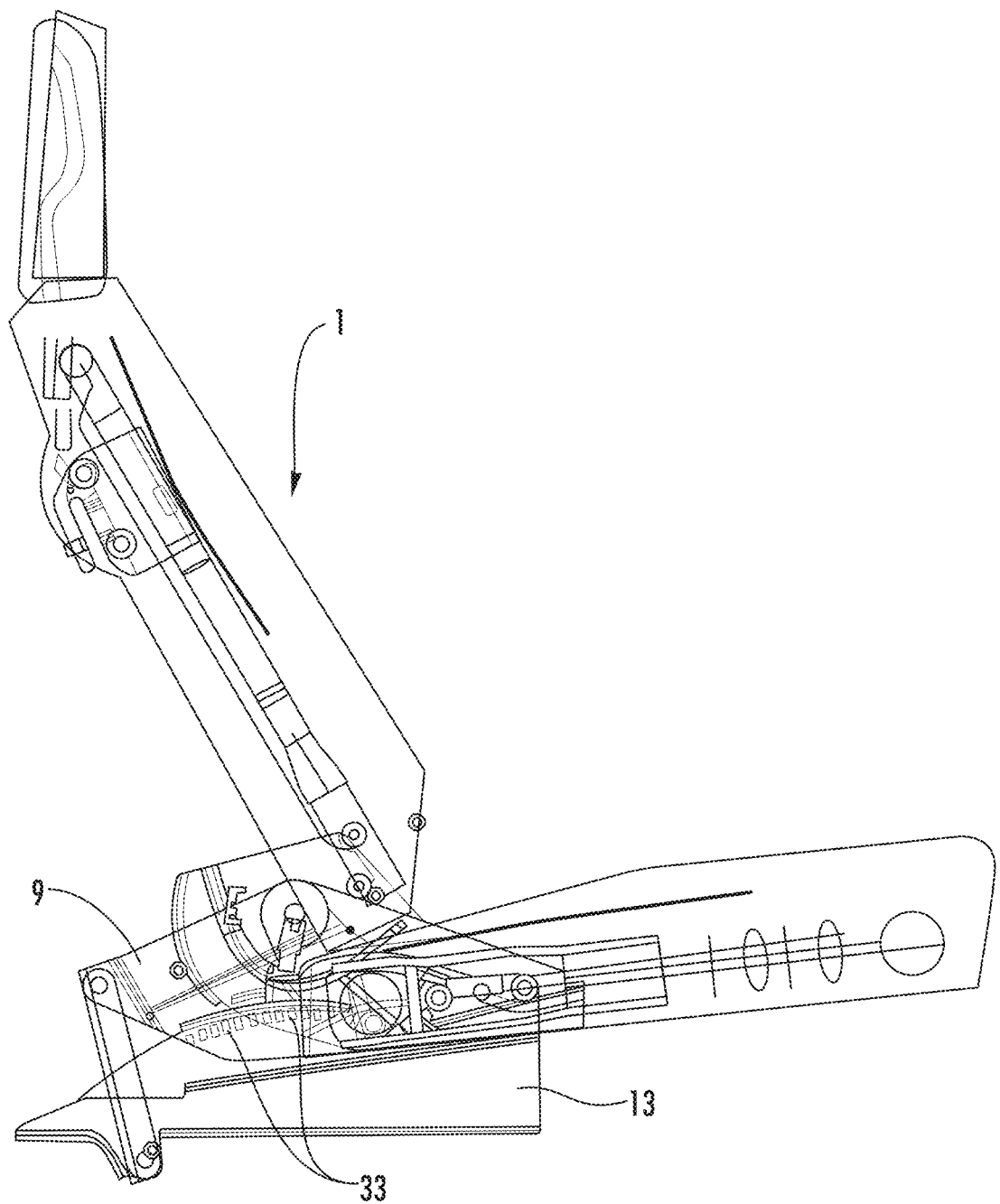
FIG. 20 is a side view of the slouch seat with the carriage in another position.
Figure 21:
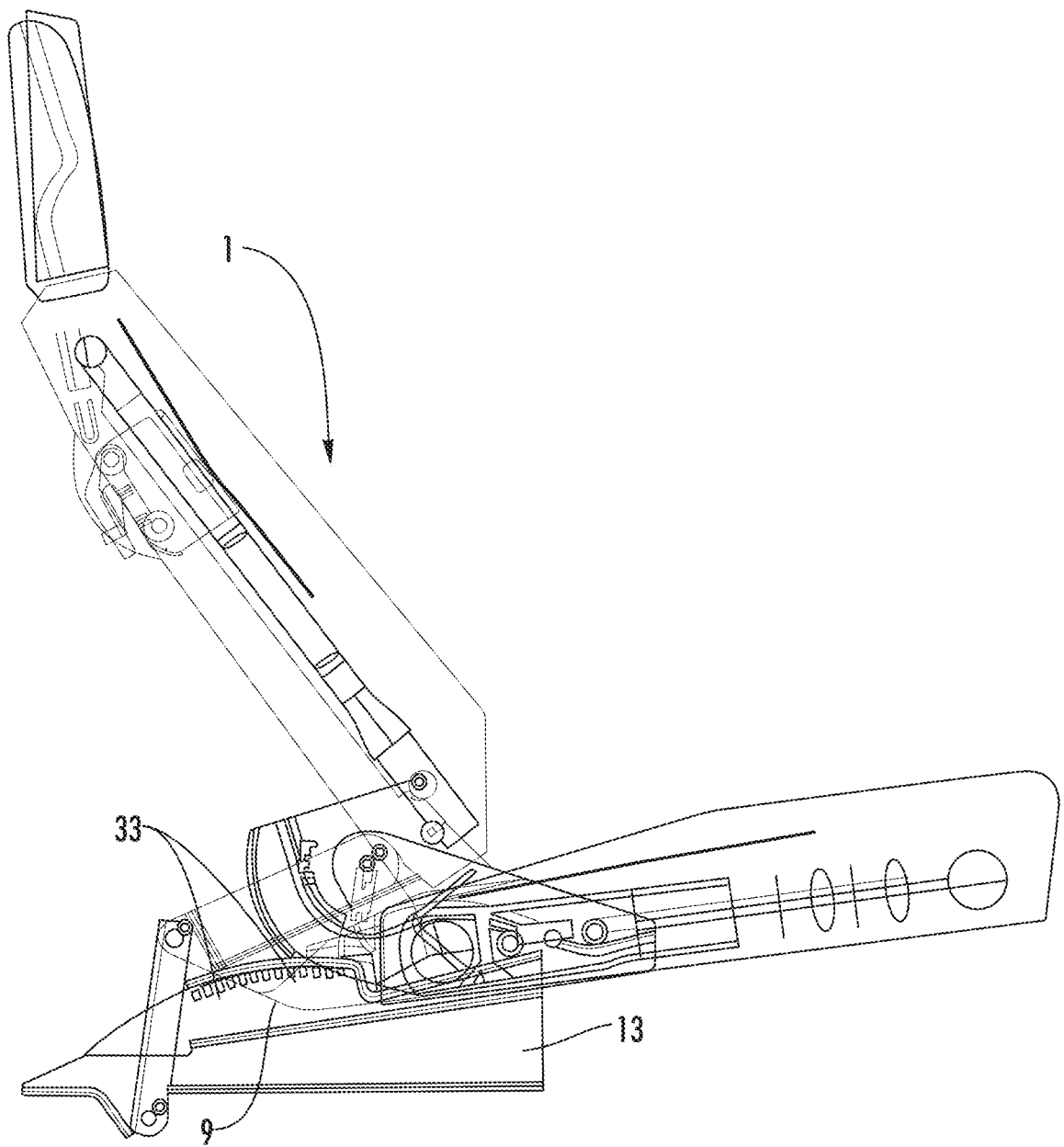
FIG. 21 is a side view of the slouch seat with the carriage in yet another position.

FIGS. 19, 20 and 21 are side views of the slouch seat 1. The features shown in FIGS. 19, 20 and 21 are substantially similar to the features of the slouch seat 1 shown in FIGS. 1, 2 and 3 except that the base structure 13 includes more than three latch points. FIGS. 19, 20 and 21 show the base structure 13 having a plurality of recesses 33. Each of the recesses 33 define a latch point. One or more of the recesses 33 receive a portion of the carriage 9 to lock the carriage 9 to the base structure 33.

Figure 22:
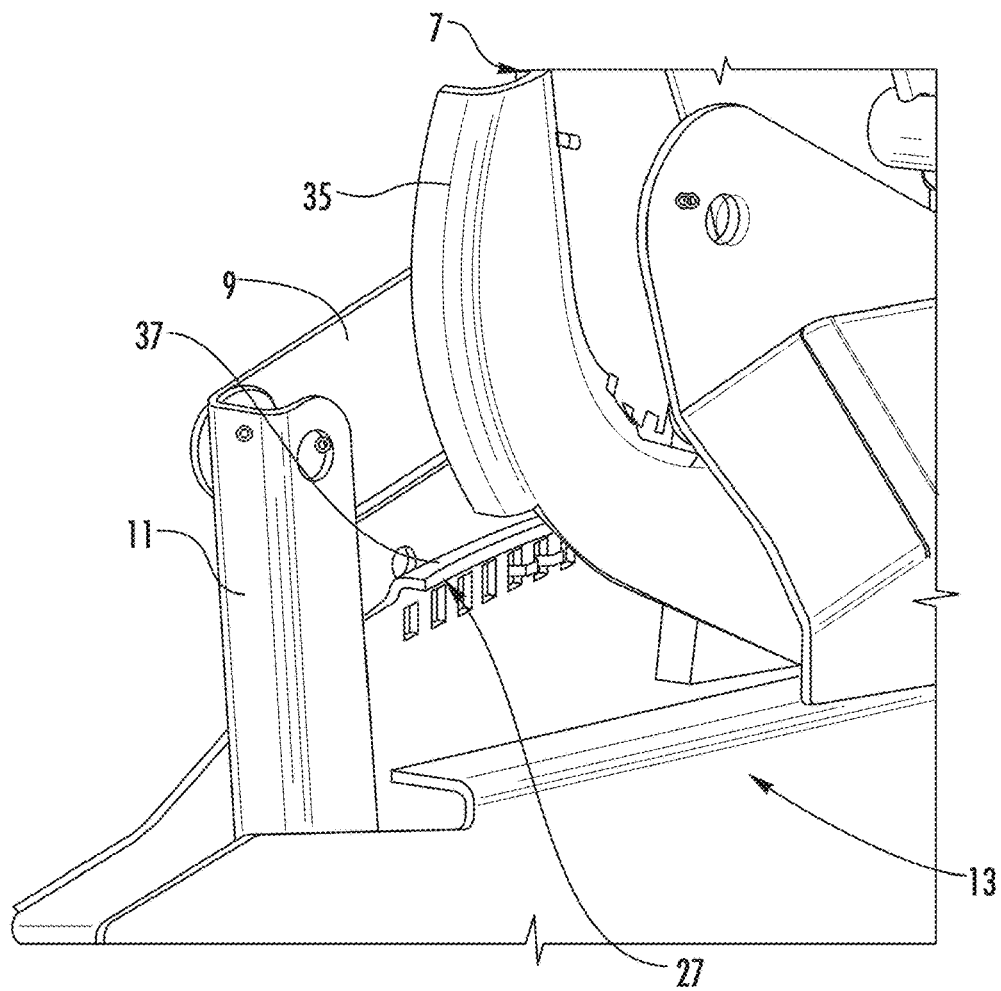
FIG. 22 is an enlarged view of the slouch seat in an area of the link element and the base structure.

FIG. 22 is an enlarged view of the slouch seat 1 in an area of the link element and the base structure 13. The seat connecting structure 7 includes a flange 35 that extends in a direction of the carriage 9. The rotation prevention structure 27 includes a flange 37 of the base structure 13. The flange 37 extends in a direction of the seat connecting structure 7. If the cushion 3 is not in a rearmost position, the flange 35 of the seat connecting structure 7 will contact the flange 37 of the base structure 13 to prevent the cushion 3 from moving in an upward direction.

Figure 23:
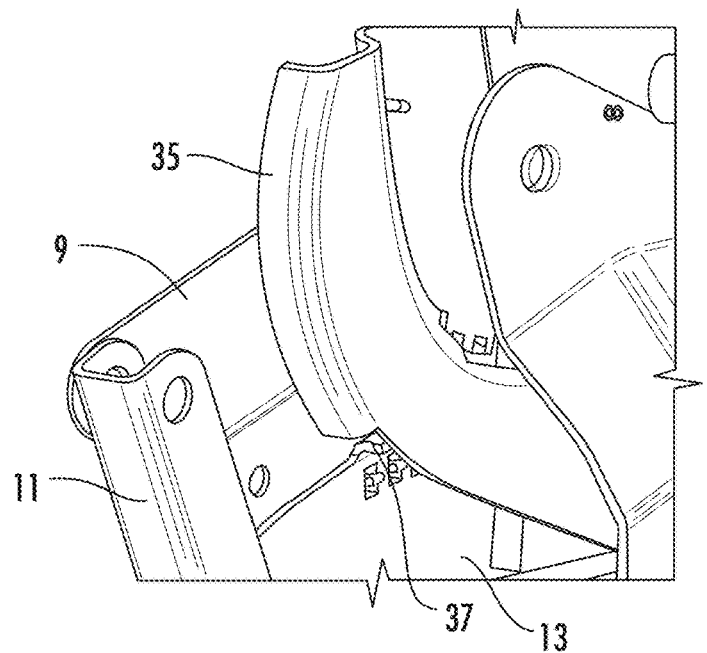
FIG. 23 is another enlarged view of the slouch seat in an area of the link element and the base structure.

FIG. 23 is an enlarged view of the slouch seat 1 in an area of the link element and the base structure 13. FIG. 23 shows the configuration of the slouch seat 1 with the cushion 3 in the rearmost position and the carriage connected to the base structure 13 at the first latch point 19. The flange 35 of the seat connecting structure 7 is located at a position beyond the flange 37 of the base structure 13 with respect to the longitudinal axis of the base structure 13, which allows the cushion to be moved in an upward direction since the flange 35 will not contact the flange 37.

Figure 24:
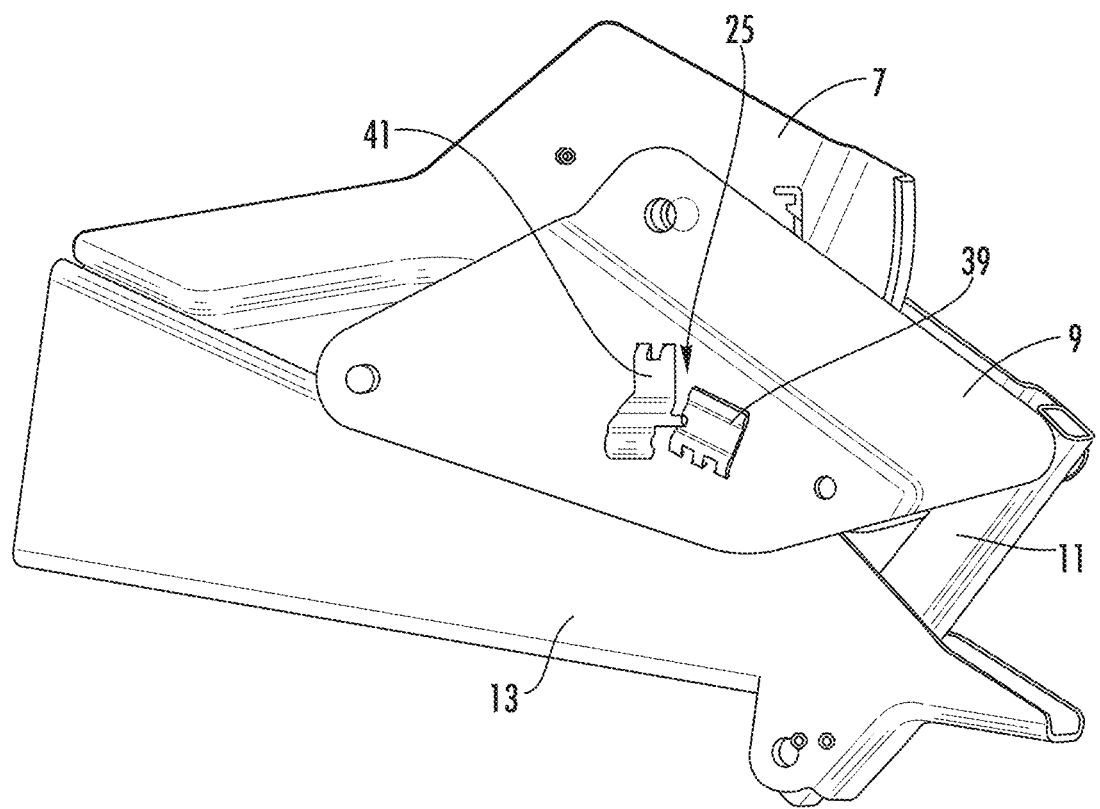
FIG. 24 is an enlarged view of the slouch seat in an area of the base structure, the link element and the carriage.

FIG. 24 is an enlarged view of the slouch seat 1 in an area of the base structure 13, the link element 11 and the carriage 9. The latching mechanism 25 includes a first latch element 39 and a second latch element 41. The first latch element may be a horizontal latch element and the second latch element 41 may be a flip or rotatable latch element. The first latch element 39 interacts with the second latch element 41 to lock and unlock the seat connecting structure 7 and/or the cushion 3 from the carriage 9 and the base structure 13. Due to the interaction of the first latch element 39 and the second latch element 41 only one handle is required and the cushion 3 can only be moved in the upward direction if the latch element 39 is in a rearmost position.

Figure 25:
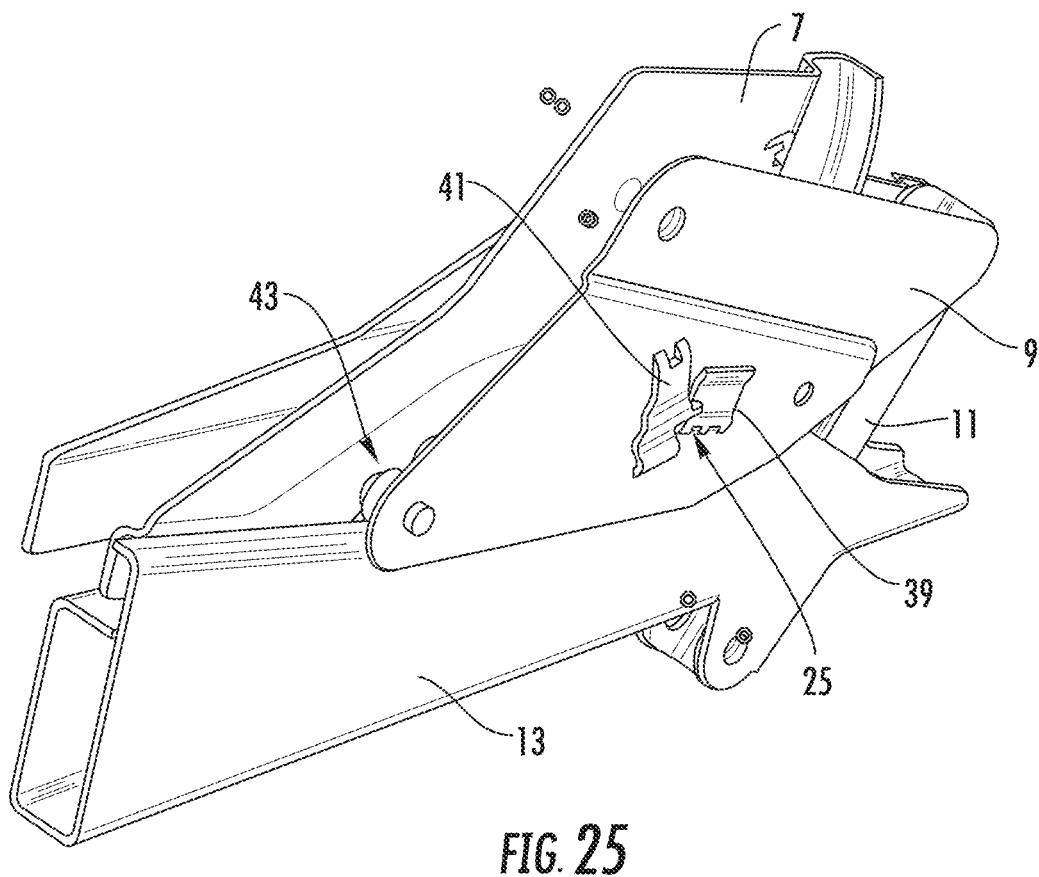
FIG. 25 is an enlarged view of the slouch seat in an area of the carriage and the base structure.

FIG. 25 is an enlarged view of the slouch seat 1 in an area of the carriage 9 and the base structure 13. The carriage 9 is connected to a bearing element 43. The bearing element 43 engages the base structure 13 and is movable along the base structure 13 when the carriage 9 moves. The bearing element 43 may be a roller bearing or a slide bearing. In another embodiment, a structure may be provided to ensure that the bearing element 43 does not move in an upward direction so that the bearing element 43 maintains in contact with the base structure 13.

Figure 26:
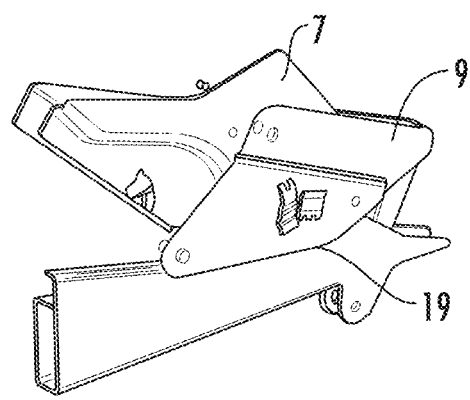
FIG. 26 is another enlarged view of the slouch seat in an area of the carriage and the base structure.

FIG. 26 is another enlarged view of the slouch seat 1 in an area of the carriage 9 and the base structure 13. The carriage 9 stays oriented to the base structure 13. The carriage 9 remains fixed relative to the base structure 13 even during movement of the seat connecting structure 7. The seat connecting structure 7 is movable relative to the base structure 13 and the carriage 9 with the carriage 9 connected to the base structure 13 at the first latch point 19.

Figure 27:
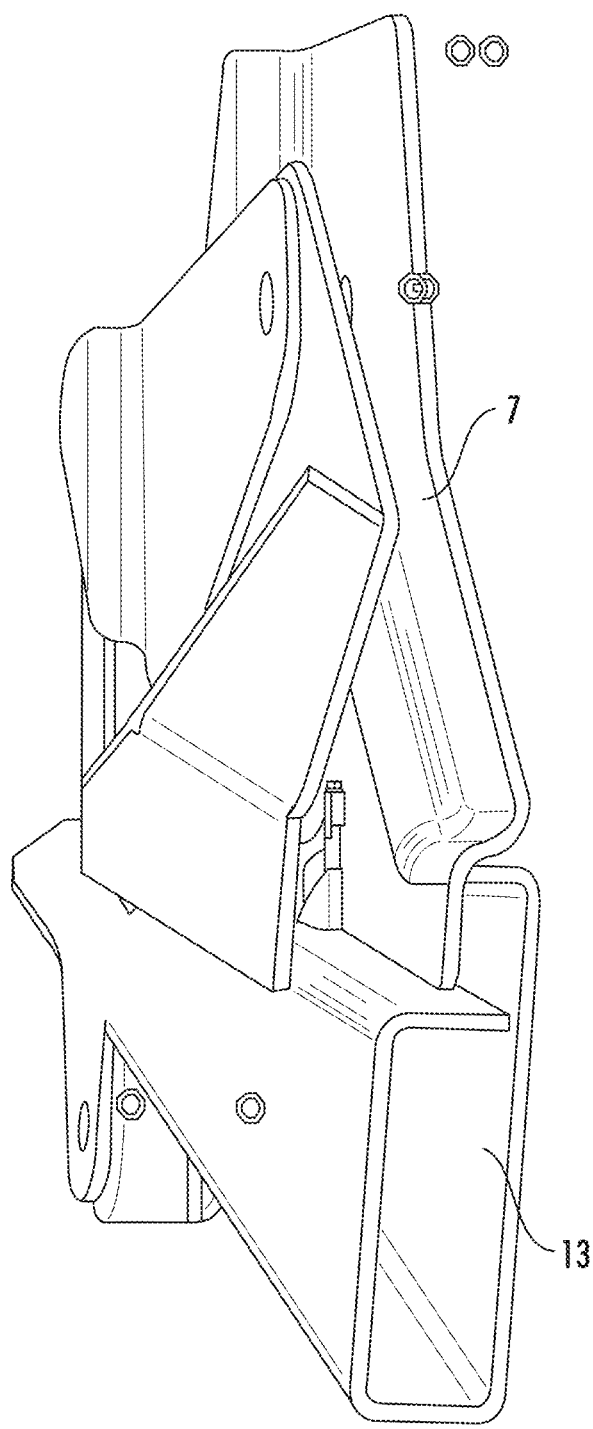
FIG. 27 is a partial enlarged view of the slouch seat in an area of the base structure and a seat connecting structure.

FIG. 27 is a partial enlarged view of the slouch seat 1 in an area of the base structure 13 and the seat connecting structure 7. The base structure 13 is designed such that the base structure can handle a compression load.

Figure 28:
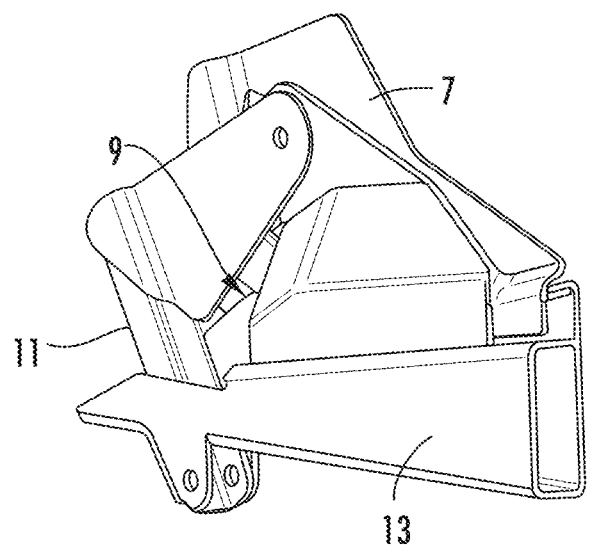
FIG. 28 is an enlarged view of the slouch seat in an area of the carriage and the base structure.

FIG. 28 is an enlarged view of the slouch seat 1 in an area of the carriage 9 and the base structure 13. The link element 11 is connected to the carriage 9 and the base structure 13. The seat connecting structure 7 is connected to the carriage 9.

Figure 29:
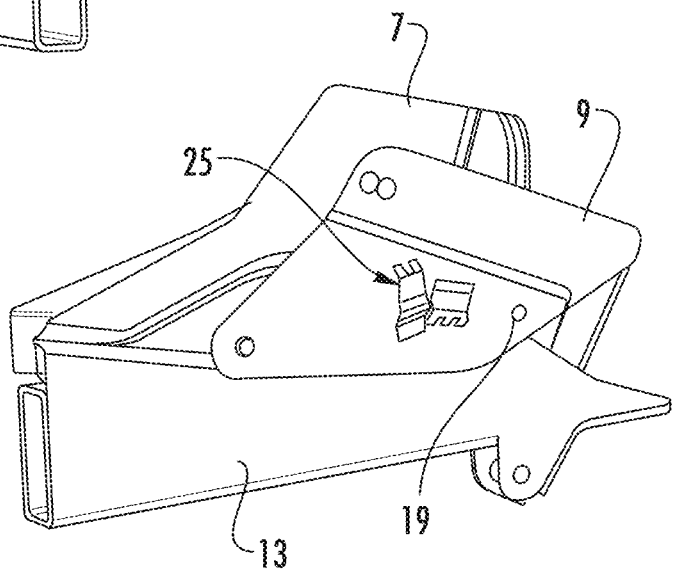
FIG. 29 is another enlarged view of the slouch seat in an area of the carriage and the base structure.

FIG. 29 is an enlarged view of the slouch seat 1 in an area of the carriage 9 and the base structure 13. The latching mechanism 25 is connected to the carriage 9 such that the latching mechanism 25 can be moved to lock the seat connecting structure 7 to the carriage 9 and the base structure 13 and unlock the seat connecting structure 7 from the carriage 9 and the base structure 13. FIG. 29 shows the seat connecting structure 7 locked to the carriage and the base structure 13 via the latch mechanism 25 with the carriage 9 connected to the base structure 13 at the first latch point 19.

Figure 30:
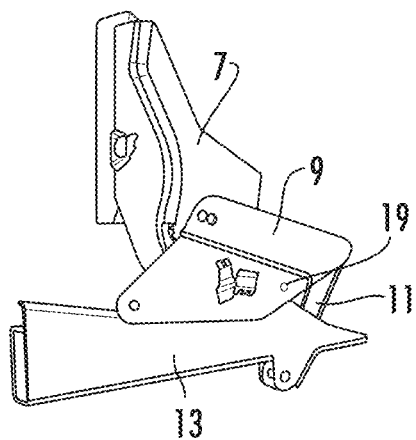
FIG. 30 is yet another enlarged view of the slouch seat in an area of the carriage and the base structure.

FIG. 30 is another enlarged view of the slouch seat 1 in an area of the carriage 9 and the base structure 13. The carriage 9 is connected to the base structure 13 at the first latch point 19. The latching mechanism 25 is in a released position, which allows the seat connecting structure 7 to move relative to the carriage 9, the link element 11 and the base structure 13. The carriage 9 and the link element 11 remain fixed to the base structure 13 as the seat connecting structure 7 moves from one position to a vertical (stadium) position.

Figure 31:
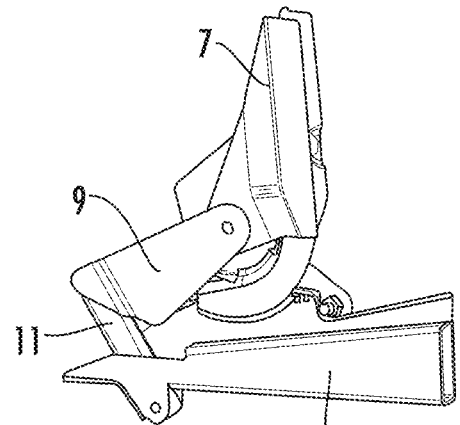
FIG. 31 is yet another enlarged view of the slouch seat in an area of the carriage and the base structure.

FIG. 31 is another enlarged view of the slouch seat 1 in an area of the carriage 9 and the base structure 13. The seat connecting structure 7 is in the vertical (stadium) position.

Figure 32:
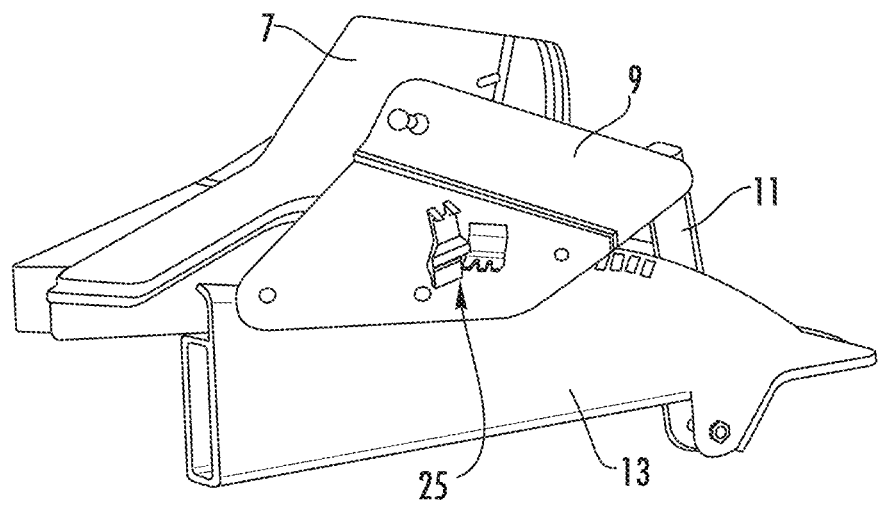
FIG. 32 is yet another enlarged view of the slouch seat in an area of the carriage and the base structure.

FIG. 32 is another enlarged view of the slouch seat 1 in an area of the carriage 9 and the base structure 13. The carriage 9 is in a position such that the seat connecting structure 7 is not able to move substantially in a vertical direction.

Figure 33:
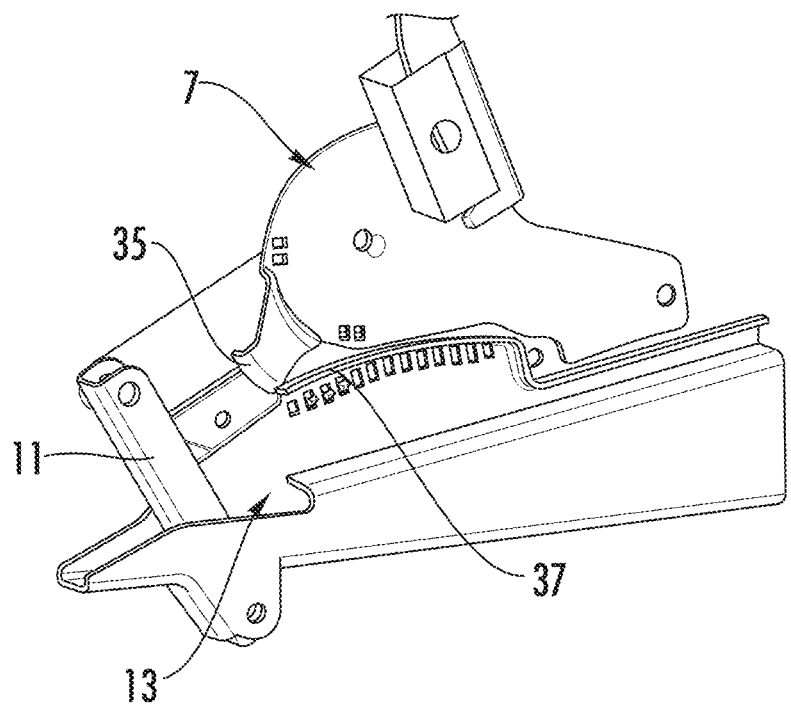
FIG. 33 is another side view of the slouch seat in the area of the link element and the base structure with the slouch seat in a rearmost position.

FIG. 33 is a side view of the slouch seat 1 in an area of the link element and the base structure 13 with the slouch seat 1 in the rearmost position. With the slouch seat 1 in the rearmost position, the flange 35 extends in a direction beyond the flange 37 with respect to a longitudinal axis of the base structure 13 such that the flange 35 does not come into contact with the flange 37. This allows the seat connecting structure 7 to rotate so that the seat cushion 3 moves in the upward direction into the vertical (stadium) position as shown FIG. 34.

Figure 34:
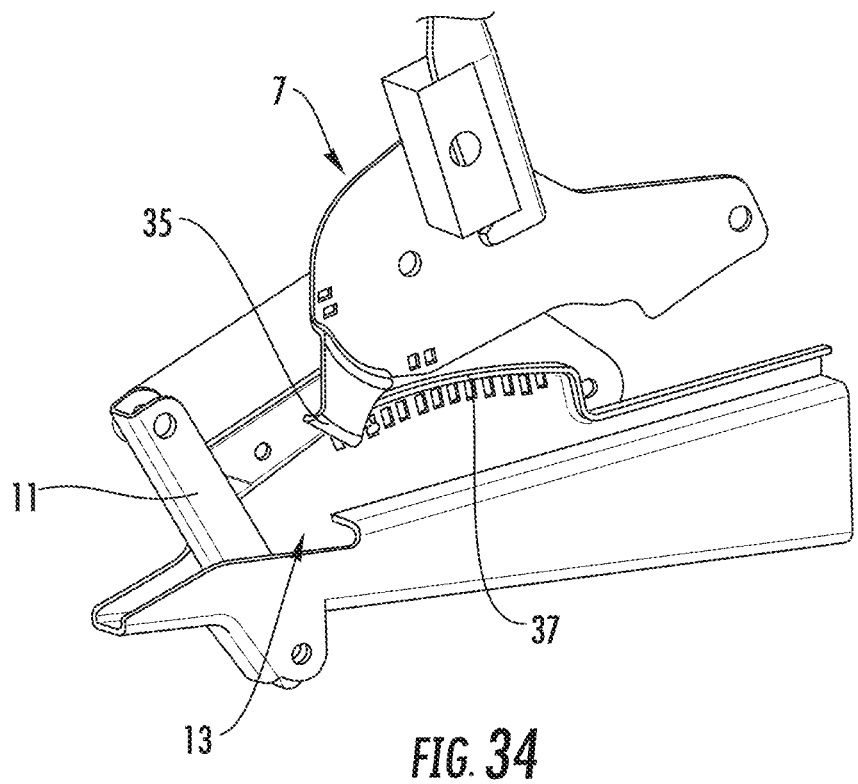
FIG. 34 is yet another side view of the slouch seat in the area of the link element and the base structure with the slouch seat in the rearmost position.

FIG. 34 is a side view of the slouch seat 1 in an area of the link element and the base structure 13 with the slouch seat 1 in the rearmost position and the seat connecting structure 7 rotating to move the slouch seat 1 in the upward direction into the vertical (stadium) position.

Figure 35:
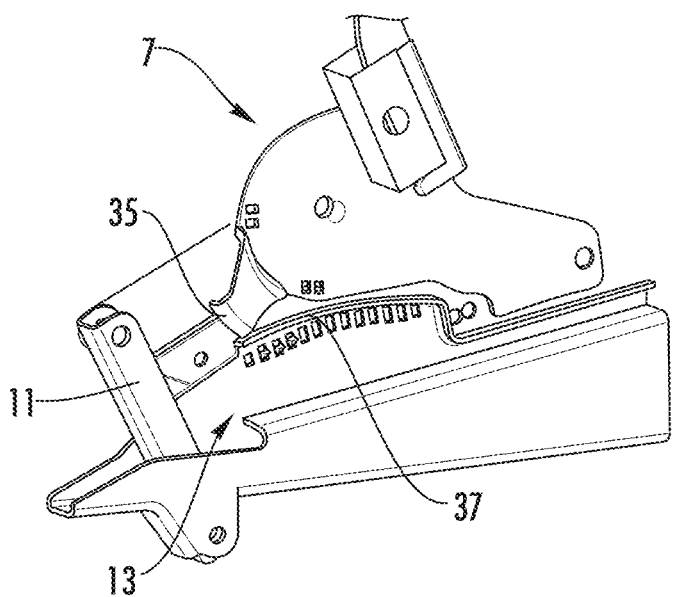
FIG. 35 is yet another side view of the slouch seat in the area of the link element and the base structure with the slouch seat in a position located forward of the rearmost position.

FIG. 35 is a side view of the slouch seat in an area of the link element and the base structure 13 with the slouch seat 1 in a position that is not in the rearmost position of the slouch seat 1 (position forward of the rearmost position). With the slouch seat 1 in a position located forward of the rearmost position, the slouch seat 1 is not able to move in the upward direction due to the flange 35 being in contact with the flange 37.

While specific embodiments of the invention have been shown and described in detail to illustrate the application of the principles of the invention, it will be understood that the invention may be embodied otherwise without departing from such principles.

What is claimed is:

1. A vehicle slouch seat, comprising:
   a cushion;
   a base structure;
   a carriage comprising a front side and a rear side;
   a link element located on said rear side of said carriage;
   a slidable element located on said front side of said carriage;
      wherein said slidable element moves relative to said base structure when said carriage moves from one of a plurality of latching points to another one of said plurality of latching points;
   a seat connecting structure;
      wherein said seat connecting structure is connected to a seat back structure and is connected to said carriage;
      wherein said seat connecting structure has a flange that extends toward said carriage;
      wherein a cushion rotation prevention structure of said base structure has a flange that extends toward said seat connecting structure and is selectively engagable with said flange of said seat connecting structure; and
      wherein said flange of said seat connecting structure engages said flange of said cushion rotation prevention structure when said cushion is not in a rearmost position allowing said cushion to move in an upward direction when said cushion is in said rearmost position.

2. A vehicle slouch seat in accordance with claim 1, further comprising:
   a latching element; and
      wherein said carriage and said cushion are locked to said base structure by said latching element.

3. A vehicle slouch seat of claim 1, wherein said cushion is in a substantially upright position when said carriage in a predetermined position.

4. A vehicle slouch seat, comprising:
   a carriage;
   a base structure;
   a link element connected to said carriage; and
   a slidable element connected to said carriage;
   a latching element, wherein at least a portion of said carriage is connected to said base structure at one of a plurality of latching points by said latching element;
   a cushion connected to said carriage;
      wherein said cushion is movable from one position to another position with said carriage connected to said base structure at one of said plurality of latching points;
      wherein said cushion is movable relative to said carriage with said carriage connected to said base structure at one of said plurality of latching points; and
      wherein said cushion is in a substantially horizontal position in said one position, and wherein said cushion is in a substantially vertical position in said another position.

5. A vehicle slouch seat of claim 4, wherein said cushion is fixed to said carriage and said base structure by said latching element; or
   wherein said cushion is fixed dynamically to said carriage by an inertia latch.

6. A vehicle slouch seat of claim 4, wherein said cushion is fixed relative to said carriage when said carriage connected to said base structure at another one of said plurality of latching points.

7. A vehicle slouch seat of claim 4, wherein said link element is pivotably connected to said base structure.

8. A vehicle slouch seat of claim 4, wherein said cushion has a first end portion a second end portion;
   wherein said first end portion of said cushion is located adjacent to at least a portion of said carriage,
   wherein said second end portion of said cushion is located a first distance from said base structure when said carriage is connected at another one of said plurality of latching points;
   wherein said second end portion of said cushion is located a second distance from said base structure when said carriage is connected at yet another one of said plurality of latching positions; and
   wherein said second distance is greater than said first distance.

9. The slouch seat of claim 4, further comprising a latching mechanism having a first latch element and a second latch element;
   wherein said first latch element selectively interacts with said second latch element to lock and unlock said seat connecting structure and/or said cushion to and/or from said carriage and said base structure; and
   wherein said cushion is movable in an upward direction when said first latch element is moved out of engagement with said second latching element.

10. A vehicle slouch seat of claim 4, wherein said slidable element moves relative to said base structure when said carriage moves from said one of said plurality of latching points to another one of said plurality of latching points.

11. A slouch seat of claim 10, wherein said link element is in a first position when said carriage is connected to said base structure at one of said plurality of latching points,
wherein said link element is at a first angle relative to said carriage when said carriage at said one of said plurality of latching points;
wherein said link element is located at a second angle relative to said carriage when said carriage is connected to said base structure at said another one of said plurality of latching points;
wherein said link element is located at a third angle relative to said carriage when said carriage connected to said base structure at yet another one of said plurality of latching points; and
wherein said first angle is less than said second angle and said third angle.

12. A vehicle slouch seat of claim 4, further comprising:
a cushion rotational prevention member for restricting movement of said cushion in a substantially vertical position when said carriage connected to said base structure at another one of said plurality of latching points.

13. A vehicle slouch seat of claim 12, wherein said plurality of latching points comprise yet another latching point; and
wherein movement of said cushion is restricted in said upward direction by said cushion rotational prevention member with said carriage connected to said base structure at said yet another latching point.

14. A vehicle slouch seat of claim 12, wherein said base structure comprises a cushion stop portion; and
wherein said cushion rotational prevention member comprises said cushion stop portion.

15. A slouch seat of claim 14, wherein said cushion has an end portion;
wherein said end portion extends to a position beyond said cushion stop portion of said base structure when said carriage is connected to said base structure at said one of said plurality of latching positions;
wherein said end portion is located at a position above said cushion stop portion of said base structure when said carriage is connected to said base structure at said another one of said plurality of latching points; and
wherein said end portion is located at another position above said cushion stop portion of said base structure when said carriage is connected to said base structure at yet another one of said plurality of latching points.

16. A vehicle slouch seat, comprising:
a cushion;
a base structure;
a carriage comprising a front side and a rear side;
a link element located on said rear side of said carriage;
a slidable element located on said front side of said carriage;
wherein said slidable element moves relative to said base structure when said carriage moves from one of a plurality of latching points to another one of said plurality of latching points;
a seat connecting structure;
wherein said seat connecting structure is connected to a seat back structure and is connected to said carriage;
wherein said seat connecting structure has a flange;
wherein a cushion rotation prevention structure of said base structure has a flange that is selectively engagable with said flange of said seat connecting structure;
wherein said flange of said seat connecting structure engages said flange of said cushion rotation prevention structure when said cushion is not in a rearmost position preventing said cushion from moving in an upward direction; and
wherein said cushion is allowed to move in said upward direction when said cushion is in said rearmost position.

17. A vehicle slouch seat of claim 16, wherein said cushion is in a substantially upright position when said carriage in a predetermined position.

18. A vehicle slouch seat, comprising:
a cushion;
a base structure;
a carriage comprising a front side and a rear side;
a link element located on said rear side of said carriage;
a slidable element located on said front side of said carriage;
wherein said slidable element moves relative to said base structure when said carriage moves from one of a plurality of latching points to another one of said plurality of latching points;
a seat connecting structure;
wherein said seat connecting structure is connected to a seat back structure and is connected to said carriage;
wherein said base structure comprises a plurality of latch points;
wherein said plurality of latch points comprises a first latch point, a second latch point, and a third latch point;
wherein at said first latch point, wherein a latching mechanism locks said cushion to said carriage and said base structure, and wherein said cushion is allowed to move in an upward direction at said first latch point by releasing said latching mechanism;
wherein at said second latch point, said cushion is fixed to said carriage and said seat connecting structure by said latching mechanism, and wherein said cushion is prevented from moving in said upward direction if said latch mechanism is released at said third latch point by a portion of said seat connecting structure engaging a cushion rotation prevention structure of said base structure; and
wherein at said third latch point, said cushion is fixed relative to said base structure by said latching mechanism, and wherein said cushion is prevented from being moved in said upward direction if said latch mechanism is released at said third latch point by a portion of said seat connecting structure engaging said cushion rotation prevention structure.

19. A vehicle slouch seat of claim 18, wherein said cushion is in a substantially upright position when said carriage in a predetermined position.

* * * * *

UNITED STATES PATENT AND TRADEMARK OFFICE
CERTIFICATE OF CORRECTION

PATENT NO. : 10,899,253 B2  
APPLICATION NO. : 16/064185  
DATED : January 26, 2021  
INVENTOR(S) : Kurt Seibold Page 1 of 1

It is certified that error appears in the above-identified patent and that said Letters Patent is hereby corrected as shown below:

In the Claims

Column 10, Claim 4, Line 11, change "element" to "mechanism"  
Column 10, Claim 4, Line 12, change "element" to "mechanism"  
Column 10, Claim 5, Line 31, change "element" to "mechanism"  
Column 10, Claim 9, Line 54, change "further comprising a" to "wherein said"

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*